(12) United States Patent
Yang

(10) Patent No.: US 7,589,793 B2
(45) Date of Patent: Sep. 15, 2009

(54) TELEVISION RECEIVER THAT CAN RECEIVE BOTH REGULAR BROADCAST-SATELLITE TELEVISION AND DIGITAL TERRESTRIAL BROADCAST

(76) Inventor: Chenhuan Yang, 31 Horizon Dr., Mendham, NJ (US) 07945

( * ) Notice: Subject to any disclaimer, the term of this patent is extended or adjusted under 35 U.S.C. 154(b) by 712 days.

(21) Appl. No.: 11/348,591

(22) Filed: Feb. 7, 2006

(65) Prior Publication Data
US 2006/0119749 A1    Jun. 8, 2006

(51) Int. Cl.
*H04N 5/44* (2006.01)
(52) U.S. Cl. ...................................................... 348/553
(58) Field of Classification Search ....................... None
See application file for complete search history.

(56) References Cited

U.S. PATENT DOCUMENTS

| | | | | |
|---|---|---|---|---|
| 5,430,492 A | * | 7/1995 | Dambacher | ................. 348/469 |
| 6,727,847 B2 | * | 4/2004 | Rabinowitz et al. | ..... 342/357.06 |
| 7,224,837 B2 | * | 5/2007 | Olshansky et al. | .......... 382/232 |
| 7,275,254 B1 | * | 9/2007 | Jutzi | ........................... 725/72 |
| 2004/0153767 A1 | * | 8/2004 | Dolgonos | .................... 714/18 |
| 2007/0249391 A1 | * | 10/2007 | van Rooyen | ............. 455/552.1 |

* cited by examiner

*Primary Examiner*—Paulos M Natnael
(74) *Attorney, Agent, or Firm*—Walter J. Tencza, Jr.

(57) ABSTRACT

A portable apparatus is provided that can receive both regular broadcast satellite television or non-digital Terrestrial Television Broadcast signals and Digital Terrestrial Television Broadcast (DTTB) signals. The portable apparatus may include a signal comparer which compares a direct satellite television broadcast signal with a digital terrestrial television broadcast signal to determine which signal has greater signal strength, and processing the signal having the greater signal strength.

16 Claims, 2 Drawing Sheets

TELEVISION RECEIVER THAT CAN RECEIVE BOTH REGULAR BROADCAST-SATELLITE TELEVISION AND DIGITAL TERRESTRIAL BROADCAST

FIELD OF THE INVENTION

This invention relates to improved methods and apparatus concerning devices for receiving real time television signals.

BACKGROUND OF THE INVENTION

There are various devices known in the prior art for receiving television signals.

SUMMARY OF THE INVENTION

One or more embodiments of the present invention provide a compact device that can receive both regular broadcast-satellite television or non-Digital Terrestrial Television Broadcast signals and Digital Terrestrial Television Broadcast (DTTB) signals or Digital Multimedia Broadcasting (DMB) signals, then output processed television video and audio signals to various portable/mobile devices. With this device, consumers can watch real-time television from almost anywhere, indoor or outdoor, through almost any portable or mobile devices. Because of its portability and non-terrene, it can be called anywhere television.

In one embodiment of the present invention a portable apparatus is provided. The portable apparatus may have a housing in which is located a receiver capable of receiving a direct satellite television broadcast signal and a digital terrestrial television broadcast signal. The receiver may be an antenna. The portable apparatus may also include a signal comparer which compares the direct satellite television broadcast signal with the digital terrestrial television broadcast signal to determine which signal has greater signal strength, a pre digital terrestrial television broadcast signal processor; and a pre satellite signal processor. If the signal comparer determines that the direct satellite television broadcast signal has greater signal strength than the digital terrestrial television broadcast signal, then the signal comparer causes the direct satellite television broadcast signal to be supplied as an original signal to the pre satellite signal processor. If the signal comparer determines that the digital terrestrial television broadcast signal has greater signal strength than the direct satellite television broadcast signal, then the signal comparer causes the digital terrestrial television broadcast signal to be supplied as an original signal to the pre digital terrestrial television broadcast signal processor.

An original signal may supplied to the pre satellite signal processor is modified by the pre satellite signal processor to form a first modified satellite signal. An original signal supplied to the pre digital terrestrial television broadcast signal processor is modified by the pre digital terrestrial television broadcast signal processor to form a first modified terrestrial signal.

The portable apparatus may also include a signal regulator and amplifier. The first modified satellite signal may be supplied to the signal regulator and amplifier and regulated by the signal regulator and amplifier to form a second modified satellite signal. The first modified terrestrial signal may be supplied to the signal regulator and amplifier and regulated by the signal regulator and amplifier to form a second modified terrestrial signal.

The portable apparatus may also be comprised of a television video and audio processor. The second modified satellite signal may be supplied to the television video and audio processor and modified by the television video and audio processor to form a third modified satellite signal. The second modified terrestrial signal may be supplied to the television video and audio processor and modified by the television video and audio processor to form a third modified terrestrial signal.

The portable apparatus may also include a display processor. The third modified satellite signal may be supplied to the display processor and modified by the display processor to form a fourth modified satellite signal. The third modified terrestrial signal may be supplied to the display processor and modified by the display processor to form a fourth modified terrestrial signal.

The portable apparatus may also include or be connected to one or more portable output devices. Each of the one or more the portable output devices can receive the fourth modified satellite signal or the fourth modified terrestrial signal. The one or more portable output devices may include various portable output devices such as a cell phone, a portable television, a VCR (video cassette recorder), a laptop computer, a PDA (personal digital assistant), or a portable DVD (digital video disc) player.

One or more embodiments of the present invention also include receiving a direct satellite television broadcast signal and a digital terrestrial television broadcast signal at a portable apparatus, and comparing the direct satellite television broadcast signal with the digital terrestrial television broadcast signal to determine which signal has greater signal strength. Depending on which signal has the greater signal strength, the appropriate signal may be processed as previously described.

DETAILED DESCRIPTION OF THE DRAWINGS

Figure 1:
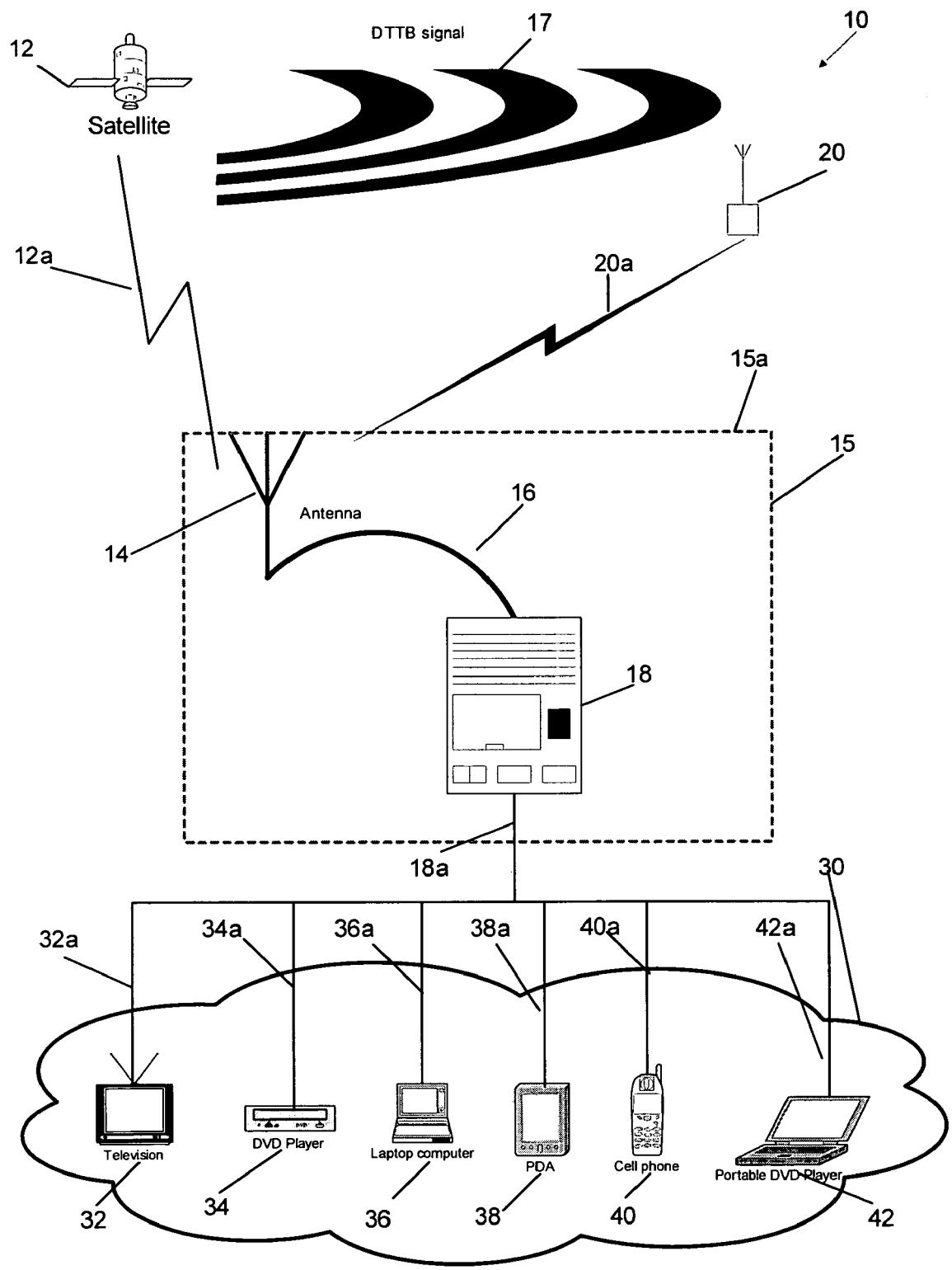
FIG. 1 shows a diagram of a method, system, and apparatus in accordance with an embodiment of the present invention.
Figure 2:
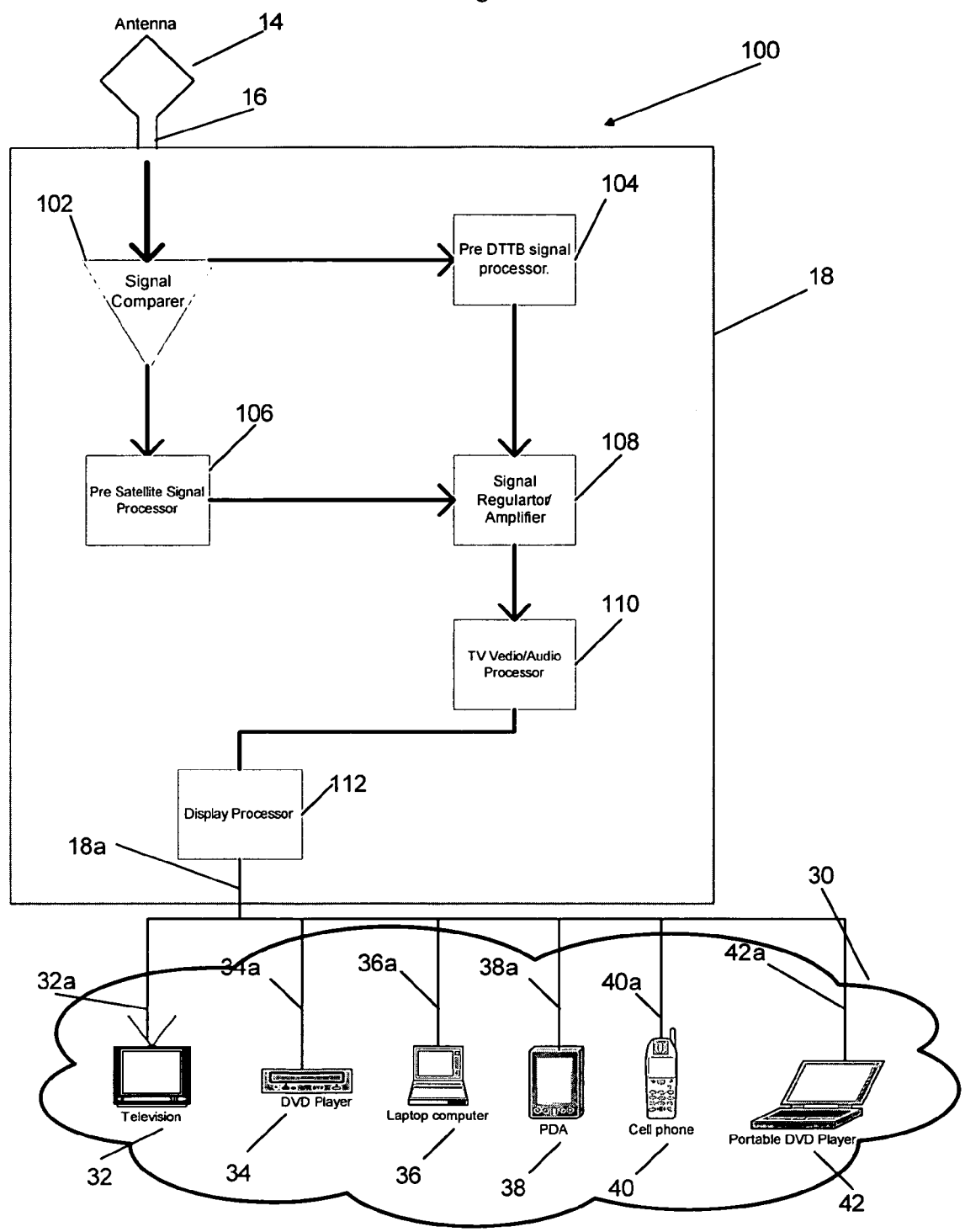
FIG. 2 shows a diagram which further details part of the method, system, and apparatus of FIG. 1.

FIG. 1 shows a diagram 10 of a method, system, and apparatus in accordance with an embodiment of the present invention. FIG. 2 shows a diagram 100 which further details part of the method, system, and apparatus of FIG. 1.

The method, system, and apparatus of FIG. 1, includes a satellite 12, an antenna 14, a cable 16, a signal processing unit 18, a set of DTTB central/local antennas 20, and a set 30 of output devices. The set 30 of output devices includes a television 32, a digital video recorder/player 34, a laptop computer 36, a PDA ("personal digital assistant") 38, a cell phone 40, and a portable DVD player 42. The satellite 12 is typically in outer space in orbit outside the earth's atmosphere. The antenna 14, cable 16 and signal processing unit 18 may be part of a portable device 15. The portable device or apparatus 15 may have a housing 15a, which is depicted by dashed lines.

In operation, the satellite 12 sends a direct satellite television broadcast signal via a communications channel 12a to the antenna 14. In addition, the same satellite 12, or a different satellite, either of which may be for example a dedicated DTTB satellite, sends a DTTB signal 17 to DDTB central/local antenna towers 20 located on the earth. The communications channel 12a includes the airwaves. The DTTB central/local antennas 20 send a DTTB signal via a communications channel 20a to the antenna 14.

The antenna 14 receives the direct broadcast satellite signal via communications channel 12a and the DTTB signal via communications channel 20a and sends these signals to the signal processing unit 18 via cable 16.

Referring to FIG. 2, the signal processing unit 18 processes the direct broadcast signal and the DTTB signal as will be explained. The signal-processing unit 18 includes a signal comparer 102, a Pre DTTB signal processor 104, a pre satellite signal processor 106, a signal regulator/amplifier 108, a TV video/audio processor 110, and a display processor 112. In operation, the signal comparer 102 receives the direct broadcast satellite signal and/or the DTTB signal from the antenna 14. The signal comparer 102 determines whether the DTTB signal or the direct broadcast signal is stronger, typically in terms of radio wave strength. If the DTTB signal is stronger, the DTTB signal is supplied to the Pre DTTB signal processor 104. The Pre DTTB signal processor can be purchased from a major telecommunications vendor.

The Pre DTTB signal processor 104 modifies the DTTB signal, typically using a current market available integrated circuit chipset to purify and magnify DTTB signals. Typically this type of integrated circuit chipset can be found in a satellite or cable box. The Pre DTTB signal processor 104 modifies the DTTB signal to form a first modified signal and supplies the first modified signal to the signal regulator/amplifier 108. The signal regulator/amplifier 108 regulates the first modified signal with a known audio/video regulator integrated chipset or module, which can be found inside a cable box and/or a television set, to form a second modified signal and supplies the second modified signal to the TV video/audio processor 110. The TV video/audio processor 110 modifies the second modified signal by using a known broadcasting audio/video signal processor, which typically can be found in existing television sets, to form a third modified signal and supplies the third modified signal to the display processor 112. The display processor 112 regulates or stabilizes the third modified signal by using a known video display integrated chipset typically found in known television sets to form a fourth modified signal and supplies the fourth modified signal to one or more of the set 30 of video devices.

The fourth modified signal from the display processor 112 is output on communication line or output 18a and supplied to inputs or communications lines 32a, 34a, 36a, 38a, 40a, and 42a, which are in communication with television 32, DVD player/recorder 34, laptop computer 36, PDA 38, cell phone 40, and portable DVD player 42, respectively.

Referring to FIG. 2, if the signal comparer 102 determines that the direct broadcast signal is stronger, typically in terms of radio wave strength, than the DTTB signal, and then the direct broadcast satellite signal is supplied to the satellite signal processor 106. The satellite signal processor 106 modifies the direct broadcast signal by using a known integrated circuit audio/video chipset, which typically can be found in a television top cable box or inside a television set. The pre satellite signal processor 106 modifies the direct broadcast signal to form a first modified direct broadcast signal and supplies the first modified direct broadcast signal to the signal regulator/amplifier 108. The signal regulator/amplifier 108 modifies and regulates the first modified audio/video signal with a known audio/video regulator integrated chipset or module, which can be found inside a cable box and/or a television set, to form a second modified direct broadcast signal and supplies the second modified direct broadcast signal to the TV video/audio processor 110. The TV video/audio processor 110 modifies the second modified direct broadcast signal by using a known broadcasting audio/video signal processor, which typically can be found in existing television sets, to form a third modified direct broadcast signal and supplies the third modified direct broadcast signal to the display processor 112. The display processor 112 regulates or stabilizes the third modified direct broadcast signal by using a known video display integrated chipset typically found in known television sets to form a fourth modified direct broadcast signal and supplies the fourth modified direct broadcast signal to one or more of the set 30 of video devices.

The fourth modified direct broadcast signal from the display processor 112 is output on communication line or output 18a and supplied to inputs or communications lines 32a, 34a, 36a, 38a, 40a, and 42a, which are in communication with television 32, DVD player/recorder 34, laptop computer 36, PDA 38, cell phone 40, and portable DVD player 42, respectively.

The diameter of the antenna 14 may be five and one quarter inches or less. The antenna 14 will adapt the most current antenna technology in the market. The signal processing unit 18 can be the size of a Walkman (trademarked) or smaller.

The set 30 of output devices may include or may be replaced by portable DVD, PDA, advanced portable game machines, auto Entertainment centers, DTTB compatible Cell phones, etc. A power supply is typically provided for the portable device 15 (antenna 14 and signal processing unit 16), which may include an AC/DC (auto adapter) and/or rechargeable batteries.

The antenna 14 may used the most current technology. The antenna 14 should be around five inches or less. As of the fourth quarter of 2005, currently in the United States, a manufacturer can produce a 5.3 inches satellite antenna for automobile or boats to receive satellite real-time television. The antenna 14 may be a dome type antenna which can receive both a direct broadcast satellite signal as well as a DTTB signal. In accordance with an embodiment of the present invention, the antenna 14 can be formed by combining a known satellite antenna with a known DTBB cell phone antenna into one unit.

The signal comparer 102 may use the most current market technology for a signal comparer. This signal comparer 102 has to switch between pre satellite signal processor 106 and pre DTTB signal processor 104 fast enough to avoid any signal loss while the portable device 15 is traveling from a point A to a point B (i.e., when a consumer is traveling, say, on airplane, the device 15 is still fast enough to process satellite or DTTB signals.). The portable device 15 can use an existing signal chip set such as an automobile's dual antenna signal comparer which is found in many luxury cars.

The Pre Satellite Signal Processor 106 will typically use the most current technology. Existing satellite receiver technology and parts can be used without the need for a chunky transformer and remote control units. An existing satellite receiver costing about $200 in United States dollars may be sufficient.

Pre DTTB signal processor 104 may be any known Pre DTTB signal processor 104. The Pre DTTB signal processor 104 may use any known existing ATSC (Advanced Television Systems Committee) chipset or Qualcom's FLO (trademarked) and MediaFLO (trademarked) chipsets (MBD1000 chipset, WCDMA (Wideband Code Division Multiple Access, a CDMA protocol for 3G communication) with some modifications to process DTTB signals. Both chipsets can be found in advanced DTTB ready cell phones. The processor 104 chipset can be purchased or licensed from a main mobile telecommunication company once it is available. An interface circuit for I/O (Input/Output) to connect to the portable device 15 can be developed once the particular chipset is selected. The interface circuit for I/O may be part of the Pre DTTB signal processor 104)

Signal Regulator and Amplifier 108 may use current portable DVD and cell phone technology to regulate and prepare audio/video television signal to be fed into display devices.

The display processor 112 may further enhance television signals. With different connectors, the display processor 112 should be able to connect to different portable video devices to show television programs. The display processor 112 can include a device package which should contain multiple connectors to allow consumer to connect to various portable/mobile devices.

The portable device 15 may be connected with an AC (alternating current) adaptor that supplies DC (Direct current) voltage, instead of an AC input, to the device 15, to save on space.

There may be a simple on-line menu and buttons to control the basic functions. Like channel up/down, on/off, volumes control. Software for controlling functions can be written either Java or machine codes.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A portable apparatus comprising:
a housing in which is located
a receiver capable of receiving a direct satellite television broadcast signal and a digital terrestrial television broadcast signal;
a signal comparer which compares the direct satellite television broadcast signal with the digital terrestrial television broadcast signal to determine which signal has greater signal strength;
a pre digital terrestrial television broadcast signal processor; and
a pre satellite signal processor;
wherein if the signal comparer determines that the direct satellite television broadcast signal has greater signal strength than the digital terrestrial television broadcast signal, then the signal comparer causes the direct satellite television broadcast signal to be supplied as an original signal to the pre satellite signal processor; and
wherein if the signal comparer determines that the digital terrestrial television broadcast signal has greater signal strength than the direct satellite television broadcast signal, then the signal comparer causes the digital terrestrial television broadcast signal to be supplied as an original signal to the pre digital terrestrial television broadcast signal processor;
wherein an original signal supplied to the pre satellite signal processor is modified by the pre satellite signal processor to form a first modified satellite signal;
wherein an original signal supplied to the pre digital terrestrial television broadcast signal processor is modified by the pre digital terrestrial television broadcast signal processor to form a first modified terrestrial signal;
and further comprising a signal regulator and amplifier;
wherein the first modified satellite signal is supplied to the signal regulator and amplifier and regulated by the signal regulator and amplifier to form a second modified satellite signal; and
wherein the first modified terrestrial signal is supplied to the signal regulator and amplifier and regulated by the signal regulator and amplifier to form a second modified terrestrial signal.

2. The apparatus of claim 1 further comprising
a television video and audio processor; and
wherein the second modified satellite signal is supplied to the television video and audio processor and modified by the television video and audio processor to form a third modified satellite signal; and
wherein the second modified terrestrial signal is supplied to the television video and audio processor and modified by the television video and audio processor to form a third modified terrestrial signal.

3. The apparatus of claim 2 further comprising
a display processor;
wherein the third modified satellite signal is supplied to the display processor and modified by the display processor to form a fourth modified satellite signal; and
wherein the third modified terrestrial signal is supplied to the display processor and modified by the display processor to form a fourth modified terrestrial signal.

4. The apparatus of claim 3 further comprising
an portable output device;
wherein the portable output device can receive the fourth modified satellite signal or the fourth modified terrestrial signal.

5. The apparatus of claim 4 wherein
the portable output device is a cell phone.

6. The apparatus of claim 4 wherein
the portable output device is a portable television.

7. The apparatus of claim 4 wherein
the portable output device is a portable laptop computer.

8. The apparatus of claim 4 wherein
the portable output device is a portable digital video disc player.

9. A method comprising:
receiving a direct satellite television broadcast signal and a digital terrestrial television broadcast signal at a portable apparatus;
comparing the direct satellite television broadcast signal with the digital terrestrial television broadcast signal to determine which signal has greater signal strength;
wherein if the direct satellite television broadcast signal has greater signal strength than the digital terrestrial television broadcast signal, then supplying the direct satellite television broadcast signal as an original signal to a pre satellite signal processor;
wherein if the digital terrestrial television broadcast signal has greater signal strength than the direct satellite television broadcast signal, then supplying the digital satellite television broadcast signal as an original signal to a pre digital terrestrial television broadcast signal processor
wherein an original signal supplied to the pre satellite signal processor is modified by the pre satellite signal processor to form a first modified satellite signal;
wherein an original signal supplied to the pre digital terrestrial television broadcast signal processor is modified by the pre digital terrestrial television broadcast signal processor to form a first modified terrestrial signal;
wherein if the direct satellite television broadcast signal has greater signal strength than the digital terrestrial television broadcast signal, supplying the first modified satellite signal to a signal regulator and amplifier to form a second modified satellite signal; and wherein if the digital terrestrial television broadcast signal has greater signal strength than the direct satellite television broadcast signal, supplying the first modified terrestrial signal to the signal regulator and amplifier and regulating the first terrestrial signal with the signal regulator and amplifier to form a second modified terrestrial signal.

10. The method of claim 9
wherein if the direct satellite television broadcast signal has greater signal strength than the digital terrestrial television broadcast signal, supplying the second modified satellite signal to a television video and audio processor and modifying the second modified satellite signal with the television video and audio processor to form a third modified satellite signal; and
wherein if the digital terrestrial television broadcast signal has greater signal strength than the direct satellite television broadcast signal, supplying the second modified terrestrial signal to the television video and audio processor and modifying the second modified terrestrial signal with the television video and audio processor to form a third modified terrestrial signal.

11. The method of claim 10
wherein if the direct satellite television broadcast signal has greater signal strength than the digital terrestrial television broadcast signal, supplying the third modified satellite signal to a display processor and modifying the third modified satellite signal with the display processor to form a fourth modified satellite signal; and
wherein if the digital terrestrial television broadcast signal has greater signal strength than the direct satellite television broadcast signal, supplying the third modified terrestrial signal to the display processor and modifying the third modified terrestrial signal with the display processor to form a fourth modified terrestrial signal.

12. The method of claim 11
receiving the fourth modified satellite signal or the fourth modified terrestrial signal at an output device.

13. The method of claim 12 wherein
the portable output device is a cell phone.

14. The method of claim 12 wherein
the portable output device is a portable television.

15. The method of claim 12 wherein
the portable output device is a portable laptop computer.

16. The method of claim 12 wherein
the portable output device is a portable digital video disc player.

* * * * *